United States Patent
Nagasawa et al.

(10) Patent No.: US 9,321,102 B2
(45) Date of Patent: Apr. 26, 2016

(54) STEERING COLUMN AND MANUFACTURING METHOD THEREOF

(71) Applicant: NSK Ltd., Tokyo (JP)

(72) Inventors: Makoto Nagasawa, Gunma (JP); Kiyoshi Sadakata, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/348,841

(22) PCT Filed: Oct. 10, 2012

(86) PCT No.: PCT/JP2012/076247
§ 371 (c)(1),
(2) Date: Mar. 31, 2014

(87) PCT Pub. No.: WO2013/054821
PCT Pub. Date: Apr. 18, 2013

(65) Prior Publication Data
US 2014/0246847 A1 Sep. 4, 2014

(30) Foreign Application Priority Data

Oct. 11, 2011 (JP) .................................. 2011-223616
May 23, 2012 (JP) .................................. 2012-117067
Jun. 11, 2012 (JP) .................................. 2012-131939
Jul. 13, 2012 (JP) .................................. 2012-157304

(51) Int. Cl.
*B22D 19/12* (2006.01)
*B62D 1/16* (2006.01)
(Continued)

(52) U.S. Cl.
CPC .............. *B22D 19/12* (2013.01); *B22D 19/045* (2013.01); *B22D 19/16* (2013.01); *B62D 1/16* (2013.01); *B22D 17/00* (2013.01); *B22D 19/14* (2013.01); *Y10T 29/49988* (2015.01)

(58) Field of Classification Search
CPC ...... B22D 19/045; B22D 19/12; B22D 19/14; Y10T 29/49988; B62D 1/16
USPC ..................... 280/775, 777, 779; 74/492, 493
See application file for complete search history.

(56) References Cited

U.S. PATENT DOCUMENTS 3,210,102 A * 10/1965 Joslin ........................... 285/374
3,824,665 A *  7/1974 Saito ...................... B21D 39/04
                                                              29/237

(Continued)

FOREIGN PATENT DOCUMENTS

EP       1245471 A1 * 10/2002 ............... B62D 1/16
GB    2 273 451 A       6/1994

(Continued)

OTHER PUBLICATIONS

International Search Report from the International Bureau of WIPO for International Application No. PCT/JP2012/076247 dated Jan. 15, 2013 and English translation of the same (6 pages).

(Continued)

*Primary Examiner* — Karen Beck
(74) *Attorney, Agent, or Firm* — Fitch Even Tabin & Flannery LLP

(57) ABSTRACT

A steering column has an overall hollow and cylindrical shape at least part of which is formed using a column member. The column member includes a main body portion having one-side end section and the other-side end section and a cylindrical member having one-side end section and the other-side section. The cylindrical member is joined in the axial direction with respect to the main body portion by fitting and fastening the other-side end section of the cylindrical member inside the one-side end section of the main body portion. The inner diameter of the end surface of the other-side end section of the cylindrical member is smaller than the inner diameter of a portion of the other-side end section of the cylindrical member. The portion of the other end section of the cylindrical member constitutes a joined section between the main body and the cylindrical member.

18 Claims, 13 Drawing Sheets

(51) Int. Cl.
  *B22D 19/04*   (2006.01)
  *B22D 19/16*   (2006.01)
  *B22D 19/14*   (2006.01)
  *B22D 17/00*   (2006.01)

(56) References Cited

U.S. PATENT DOCUMENTS

| | | | | |
|---|---|---|---|---|
| 4,257,155 | A | * | 3/1981 | Hunter .............................. 29/511 |
| 4,482,174 | A | * | 11/1984 | Puri ............................ 285/382.2 |
| 4,624,489 | A | * | 11/1986 | Nakamura ..................... 285/382 |
| 5,537,890 | A | * | 7/1996 | Thomas ................. B62D 1/184 |
| | | | | 280/775 |
| 5,918,914 | A | * | 7/1999 | Morris ........................... 285/351 |
| 6,976,712 | B2 | * | 12/2005 | Lukach, Jr. ................... 285/351 |
| 7,097,211 | B2 | * | 8/2006 | Adams ........................... 285/321 |
| 7,779,945 | B2 | * | 8/2010 | Allgauer ......................... 180/78 |
| 8,342,579 | B2 | * | 1/2013 | Hennemann et al. .......... 285/319 |
| 8,991,861 | B1 | * | 3/2015 | Iwakawa ................ B62D 1/181 |
| | | | | 280/775 |
| 8,997,602 | B2 | * | 4/2015 | Tanaka ................... B62D 1/184 |
| | | | | 280/775 |
| 2004/0118238 | A1 | * | 6/2004 | Toth et al. ........................ 74/492 |
| 2005/0194775 | A1 | * | 9/2005 | Bastein ..................... F16D 3/06 |
| | | | | 280/775 |
| 2011/0239809 | A1 | * | 10/2011 | Beneker et al. ................. 74/493 |
| 2011/0247891 | A1 | * | 10/2011 | Meyer et al. ................... 180/443 |
| 2011/0256419 | A1 | * | 10/2011 | Iwayama et al. ............... 428/627 |
| 2012/0160051 | A1 | * | 6/2012 | Walser ............................. 74/492 |
| 2012/0324965 | A1 | * | 12/2012 | Yamamoto .............. B62D 1/16 |
| | | | | 70/183 |
| 2013/0228034 | A1 | * | 9/2013 | Hebenstreit ............. B21C 23/18 |
| | | | | 74/493 |
| 2013/0276569 | A1 | * | 10/2013 | Davies et al. ................... 74/492 |
| 2014/0026708 | A1 | * | 1/2014 | Okada et al. .................... 74/495 |
| 2014/0127069 | A1 | * | 5/2014 | Bae et al. ......................... 419/19 |
| 2014/0150596 | A1 | * | 6/2014 | Nagasawa ....................... 74/492 |
| 2014/0157938 | A1 | * | 6/2014 | Erhardt .................... B62D 1/16 |
| | | | | 74/492 |
| 2014/0216197 | A1 | * | 8/2014 | Erhardt et al. .................. 74/492 |
| 2014/0246847 | A1 | * | 9/2014 | Nagasawa et al. ............. 280/771 |
| 2014/0311273 | A1 | * | 10/2014 | Nagasawa ................ B62D 1/16 |
| | | | | 74/492 |
| 2014/0345414 | A1 | * | 11/2014 | Erhardt et al. .................. 74/492 |

FOREIGN PATENT DOCUMENTS

| | | |
|---|---|---|
| JP | S52-171060 U | 12/1977 |
| JP | H06-211137 A | 8/1994 |
| JP | 2005-349968 A | 12/2005 |
| JP | 2007-223383 A | 9/2007 |
| JP | 2008-265358 A | 11/2008 |
| JP | 2008-265646 A | 11/2008 |
| JP | 2009-149228 A | 7/2009 |
| JP | 2010-036677 A | 2/2010 |
| JP | 2011-073547 A | 4/2011 |
| JP | 2011-73547 A | 4/2011 |

OTHER PUBLICATIONS

The Extended European Search Report dated Apr. 1, 2015 for European Patent Application No. 12840514.9.
The Japanese Office Action dated Mar. 31, 2015 for Japanese Patent Application No. 2014-022148 and English translation of the same.

* cited by examiner

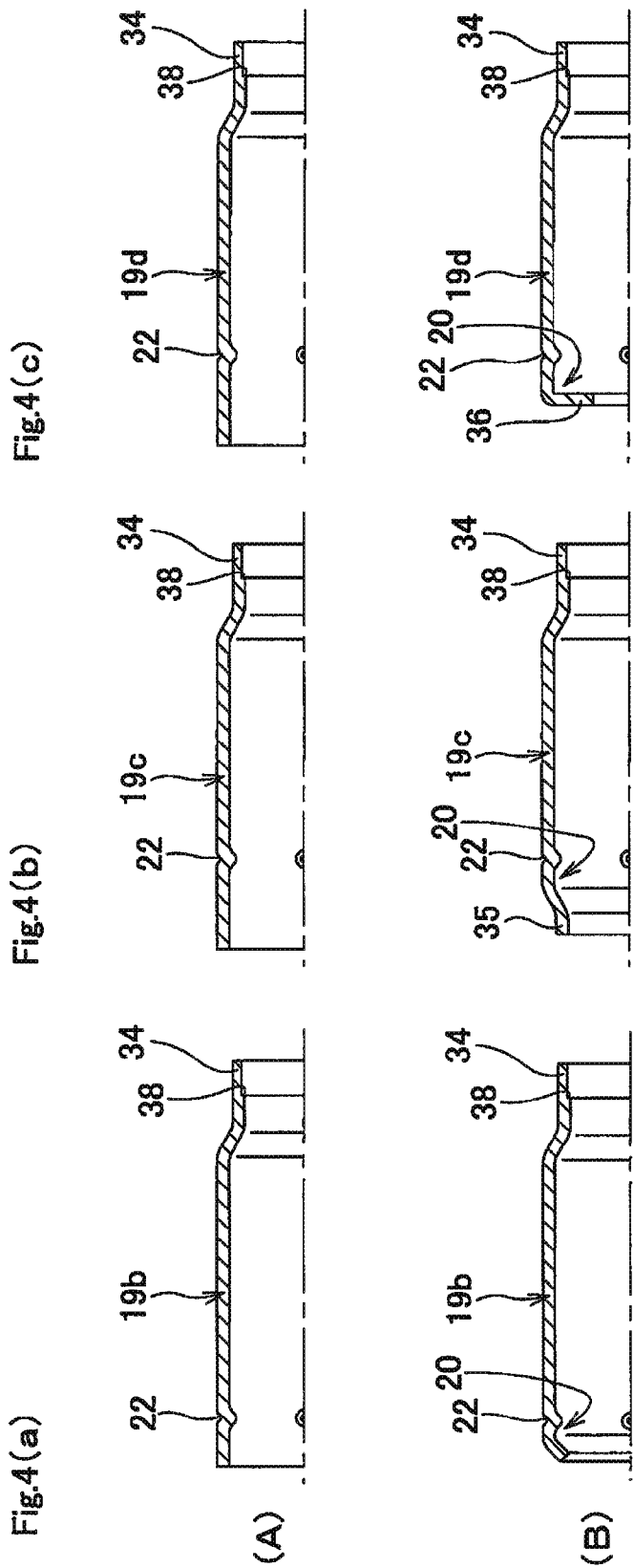

US 9,321,102 B2

STEERING COLUMN AND MANUFACTURING METHOD THEREOF

CROSS-REFERENCE TO RELATED APPLICATIONS

This application is a U.S. national phase application filed under 35 U.S.C. §371 of International Application PCT/JP2012/076247, filed on Oct. 10, 2012, designating the United States, which claims priority from Japanese Application Number 2011-223616, filed Oct. 11, 2011, Japanese Application Number 2012-117067, filed May 23, 2012, Japanese Application Number 2012-131939, filed Jun. 11, 2012, and Japanese Application Number 2012-157304, filed Jul. 13, 2012, which are hereby incorporated herein by reference in their entirety.

TECHNICAL FIELD

The present invention relates to a steering column of an automobile steering apparatus, and to a manufacturing method thereof.

BACKGROUND ART

As a steering apparatus for applying a steering angle to steered wheels (except in the case of special vehicles such as a forklift, the steered wheels are normally the front wheels), construction such as illustrated in FIG. 12 is widely known. In this steering apparatus, a steering shaft 3 is supported so as to be able to rotate freely on the inner-diameter side of a cylindrical shaped steering column 2 that is supported by the vehicle body 1. A steering wheel 4 is fastened to the rear-end section of the steering shaft 3 that protrudes further toward the rear than the rear-end opening of the steering column 2. When the steering wheel 4 is rotated, this rotation is transmitted to an input shaft 8 of a steering gear unit 7 by way of the steering shaft 3, a universal joint 5a, an intermediate shaft 6 and a universal joint 5b. As the input shaft 8 rotates, a pair of tie rods 9 that are located on both sides of the steering gear unit 7 are pushed or pulled, which applies a steering angle to a pair of left and right steered wheels according to the amount that the steering wheel 4 is operated.

In the construction illustrated in FIG. 12, in order to make it possible to adjust the forward-backward position of the steering wheel 4, an expandable and contractible steering column 2 and steering shaft 3 are used. Moreover, during a collision accident, following the primary collision that occurs when an automobile hits another automobile or the like, a secondary collision occurs when the body of the driver hits the steering wheel 4. However, the steering column 2 and steering shaft 3 include construction for protecting the driver by absorbing the impact energy and allowing the steering wheel 4 to displace in the forward direction. More specifically, construction is employed in which the steering shaft 3 that supports the steering wheel 4 is supported by the vehicle body 1 so as to be able to displace in the forward direction due to an impact load in the forward direction that occurs during a secondary collision. In the construction illustrated in FIG. 12, the steering shaft 3 includes an outer tube 11 and an inner shaft, and together with the outer tube 11 being able to displace in the forward direction as the overall length of the steering shaft 3 contracts due to an impact load during a secondary collision, the steering column 2 that supports the steering shaft 3 includes an outer column 10 and an inner column, and that outer column 10 is supported by the vehicle body 1 so that the outer column 10 is able to displace in the forward direction as the overall length of the steering column 2 contracts. It is also possible for the front and rear positions of the outer column and inner column of the expandable and contractible steering column, and the outer tube and inner shaft of the steering shaft, to be opposite that of the construction illustrated in the figure.

On the other hand, as a countermeasure against theft of an automobile, automobiles are equipped with various kinds of anti-theft apparatuses. As one kind of such an apparatus, a steering lock apparatus, that makes it impossible to operate the steering wheel unless a proper key is used, is widely used. FIG. 13 illustrates construction of an example of a steering lock apparatus as disclosed in JP2008-265646 (A). The steering lock apparatus 12 is such that a lock unit 13 is provided in part of the steering column 2a, and a key lock collar 15, on which an engagement concave section 14 is formed in at least one location in the circumferential direction, is fitted onto and fastened to part of the steering shaft 3a whose phase in the axial direction coincides with that of the lock unit 13. When the steering lock apparatus is in operation (when the key is locked), it is possible to substantially unable to rotate the steering shaft 3a by displacing the tip-end section of the lock pin 16, that is a component of the lock unit 13, toward the inner diameter side of the steering column 2a through a lock through hole 17 that is formed in the middle section in the axial direction of the steering column 2a, and by engaging the tip-end section of the lock pin 16 with the engagement concave section 14.

When this kind of steering lock apparatus 12 is assembled in a steering apparatus, the lock unit 13 is provided on the outer-diameter side of the steering column 2a, and the key-lock collar 15 is provided on the inner-diameter side of the steering column 2a. Therefore, in order to place the key-lock collar 15 on the inner-diameter side of the steering column 2a so as to be able to rotate, and to securely engage or disengage the lock pin 16 and the key-lock collar 15 without making the stroke of the lock pin 16 too large, it is necessary to make the thickness of the steering column 2a where the steering lock apparatus 12 is assembled thin by making the outer diameter of the steering column 2a small in at least the portion where the steering lock apparatus 12 is assembled, and making the inner diameter thereof larger.

FIG. 14 illustrates an outer column 10a that is a component of a steering column as disclosed in JP2007-223383 (A). In one end section in the axial direction of the outer column 10a (the left end section in FIG. 14), the other end section of the cylindrical shaped inner column is fitted in a state such that relative displacement in the axial direction is possible. The outer column 10a is made of a light alloy such as an aluminum alloy, a magnesium alloy or the like, and is formed into a single body by casting. A lock through hole 17a is provided in the middle section in the axial direction of the outer column 10a in order for a steering lock apparatus 12 such as illustrated in FIG. 13 to be assembled. When the thickness of this kind of outer column 10a has been made thin, there is a possibility that the strength of the outer column, which is essential when the steering lock apparatus 12 is operated, will not be sufficiently secured. In other words, when trying to rotate the steering wheel 4 (see FIG. 12) with a large force in a state in which the lock pin 16 that protrudes toward the inner-diameter side of the outer column 10a through the lock through hole 17a is engaged with the engagement concave section 14 of the key-lock collar 15 (see FIG. 13), an excessively large force is applied to the peripheral edge section of the lock through hole 17a, and there is a possibility that this peripheral edge section will deform. In order to overcome this problem, it is feasible to form the outer column 10a using an iron alloy. However, then another problem occurs such as the weight of the overall steering column increases.

SUMMARY OF INVENTION

In consideration of the situation described above, it is the object of the present invention to achieve construction of a steering column in which the thickness of part of the steering column can be made thin, and for which the overall strength can be secured.

The steering column of the present invention has an overall hollow and cylindrical shape, and all or part thereof is formed using a column member. This column member has:

a main body portion that is made of a light metal alloy such as aluminum alloy, magnesium alloy and the like and that has one-side end section and another-side end section; and a cylindrical member that is made of an iron alloy, that has one-side end section and another-side end section, and that is joined in the axial direction with respect to the main body portion by fitting and fastening the other-side end section of the cylindrical member inside the one-side end section of the main body portion, the inner diameter of an end surface of the other-side end section of the cylindrical member being smaller than the inner diameter of a portion of the other-side end section of the cylindrical member that constitutes a joined section between the main body portion and the cylindrical member. Here, the one-side means one side in the axial direction of the steering column, and the other-side means the opposite side in that axial direction.

Preferably, the inner diameter of the other-side end section of the cylindrical member is equal to or greater than the inner diameter of a portion of the main body portion that is separated in the axial direction from the joined section.

Moreover, it is preferable to engage a convex section that is provided on the inner circumferential surface of the one-side end section of the main body portion with a concave section that is provided on the outer circumferential surface of the other-side end section of the cylindrical member.

Alternatively, it is preferable to engage a concave section that is provided on the inner circumferential surface of the one-side end section of the main body portion with a convex section that is provided on the outer circumferential surface of the other-side end section of the cylindrical member.

The concave section can be at least one concave section that is provided on part in the axial direction of the outer circumferential surface of the other-side end section of the cylindrical member, and in part in the circumferential direction thereof; and is depressed inward in the radial direction. However, preferably, the concave section is composed of a concave groove in the axial direction that extends in the axial direction and is provided in at least one location in the circumferential direction.

Alternatively or additionally, the concave section can be composed of a concave groove in the circumferential direction that extends in the circumferential direction and is provided in at least one location in the axial direction.

Furthermore, the concave section can be a knurling pattern that is formed by performing a knurling process on the outer circumferential surface of the other-side end section of the cylindrical member.

The steering column of the present invention is preferably used in a steering apparatus having a steering lock apparatus, and in that case, a lock through hole of the steering apparatus is provided at one location in the middle section in the axial direction of the cylindrical member.

The manufacturing method for a steering column of the present invention is characterized in obtaining the column member by the following steps. That is, this method comprises steps of inserting the other-side end section of the cylindrical member through an insertion hole that is open in one-side end surface of a mold such that the other-side end section of cylindrical member protrudes inside the mold; inserting one-side end section of a core into the other-side end section of the cylindrical member; obtaining the column member by feeding molten metal into the mold and forming the main body portion and joining the one-side end section of the main body portion to the other-side end section of the cylindrical member by way of the joined section. These steps can be performed in different orders as long as there is no contradiction.

Preferably, the method for manufacturing a steering column of the present invention has a further step of forming the main body portion such that the inner diameter of the end surface of the other-side end section of the cylindrical member is smaller than the inner diameter of the portion of the main body portion that is separated in the axial direction from the joined section, and after forming the main body portion, performing a machining process on the inner-diameter side portion of the tip-end section of the other-side end section of the cylindrical member such that the inner diameter of the other-side end surface of cylindrical member is equal to or greater than the inner diameter of the portion of the main body portion that is separated in the axial direction from the joined section.

In one embodiment of the method for manufacturing a steering column of the present invention, a concave section is provided on the outer circumferential surface of the other-side end section of the cylindrical member, and when forming the main body portion, a convex section is formed on the inner circumferential surface of the one-side end section of the main body portion by feeding part of the molten metal into the concave section. In the case where the concave section is composed of the concave groove in the axial direction, it is preferable to form this concave groove in the axial direction by a machining process, and in the case where the concave section is composed of the concave groove in the circumferential direction, it is preferable to form this concave groove in the circumferential direction by a turning process. On the other hand, in another embodiment of the method for manufacturing a steering column of the present invention, a convex section is provided on the outer circumferential surface of the other-side end section of the cylindrical member, and when forming the main body portion, a concave section is formed on the inner circumferential surface of the one-side end section of the main body portion by feeding part of the molten metal into a portion around the convex section.

More preferably, the method for manufacturing a steering column of the present invention has a further step of performing a drawing process on the tip-end section of the other-side end section of the cylindrical member before inserting the other-side end section of the cylindrical member through the insertion hole of the mold, and providing the concave groove in the axial direction on the outer circumferential surface of the other-side end section of the cylindrical member at the same time of making the inner diameter of the other-side end surface of the cylindrical member smaller than the inner diameter of the portion of the other-side end section of the cylindrical member that constitutes the joined section between the main body portion and the cylindrical member.

Particularly, in the case where the concave section is composed of at least one concave section that is depressed inward in the radial direction, the concave section can be formed by performing a pressing process on the outer circumferential surface of the other-side end section of the cylindrical member.

In this way, the steering column of the present invention is a steering column having an overall hollow and cylindrical shape, and the column member constituting at least part of this steering column has a main body portion that is made of a light metal alloy, and a cylindrical member that is made of an iron alloy, and is joined in the axial direction with respect to the main body portion by fitting and fastening the other-side end section of the cylindrical member inside the one-side end section of the main body portion; the inner diameter of the other-side end section of the cylindrical member is equal to or greater than the inner diameter of the portion of the main body portion that is separated in the axial direction from the joined section between the main body portion and the cylindrical member, and the thickness of the cylindrical member is substantially constant except for the inner circumferential edge of the tip-end section of the front-end section of the cylindrical member and the rear-end section thereof where a bearing is locked.

The steering apparatus of the present invention has: a steering column that is supported by a vehicle body; a steering shaft that is supported on the inner-diameter side of the steering column so as to be able to rotate; and a steering lock apparatus that is provided between the steering column and the steering shaft, and that substantially prevents the steering shaft from rotating inside the steering column during operation; and particularly, the steering column of the present invention is used as this steering column.

With the steering column of the present invention, it is possible to secure the strength of the steering column while making the thickness of part of the steering column thin. In other words, a portion near one side of the column member constituting this steering column is composed of a cylindrical member that is made of an iron alloy, so it is possible to secure the strength of the portion near the one side even though the thickness of this portion is made to be thin. On the other hand, the portion near the other side of the column member is composed of a main body portion that is made of a light metal alloy such as aluminum alloy, magnesium alloy and the like, so the overall weight of the steering column does not increase excessively.

Moreover, it is possible to make the inner diameter of at least the other-side end section of the cylindrical member constituting the portion near the one side of the column member of the steering column larger than the inner diameter of the portion of the main body portion that is separated in the axial direction from the joined section between the main body portion and the cylindrical member, except for the tip-end section of the other-side end section of the cylindrical member. Furthermore, when performing a machining process on the inner diameter of the joined section between the main body portion and the cylindrical member, except for the tip-end section of the other-side end section of the machining is not performed on the cylindrical member having thin thickness, so it is possible to prevent a decrease in strength of the cylindrical member.

In addition, the steering column of the present invention does not have complex construction, so can be industrially produced with good efficiency and at low cost.

BRIEF DESCRIPTION OF THE DRAWINGS

FIGS. 4A(a) and 4B(a) illustrate a second example of an embodiment of the present invention, and correspond to FIGS. 2A and 2B; FIG. 4A(b) and 4B(b) illustrate a third example of an embodiment of the present invention, and correspond to FIGS. 2A and 2B; and FIGS. 4A(c) and 4B(c) illustrate a fourth example of an embodiment of the present invention, and correspond to FIGS. 2A and 2B.

DETAILED DESCRIPTION OF THE PREFERRED EMBODIMENTS

First Example

FIG. 1A to FIG. 2B illustrate a first example of an embodiment of the present invention. A feature of the present invention, including this example, is to industrially achieve construction of a steering column that is capable of ensuring strength even when the thickness of the rear half section (right side in FIGS. 1A to 1C) of an outer column 10b, which is a column member of the steering column, is thin. The construction and function of the other parts are the same as in a conventional steering column and manufacturing method thereof, therefore, figures and explanations of identical portions will be omitted or simplified such that the following explanation centers on the features of this example.

In this example, the outer column 10*b* is formed by joining together in the axial direction a main body portion 18 that is made of a light alloy such as an aluminum alloy, magnesium alloy or the like, and a cylindrical member 19 that is made of an iron alloy such as carbon steel. In other words, the front-end section 20, which is the other-side end section (left side in FIG. 1), of the cylindrical member 19 is fitted inside of and joined to the rear-end section, which is the one-side end section (right side in FIG. 1), of the main body portion 18. Therefore, the main body portion 18 forms the front-half section of the outer column 10*b*, and the cylindrical section 19 forms the rear-half section of the outer column 10*b*. The main body portion 18 corresponds to a portion of the steering column or outer column 10*b* that has construction for being supported by and fastened to the vehicle body. Moreover, one-side means one side in the axial direction of the steering column, and the other-side means the opposite side in that axial direction of the steering column. Where in the example in the figures, the rear side of the vehicle body corresponds to the one side, and the front side of the vehicle body corresponds to the other side. However, in the present invention, in the case where the cylindrical member is joined to the front of the main body portion, the front side of the vehicle body becomes the one side, and the rear side of the vehicle body becomes the other side. Furthermore, construction in which a cylindrical member is joined to both sides of the main body portion is also included in the present invention.

Figure 1A:
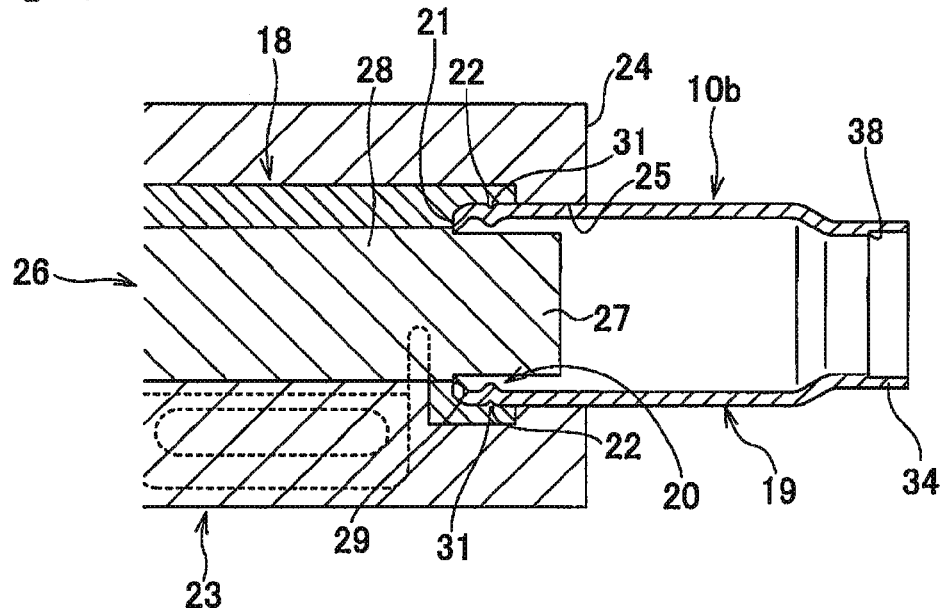
FIGS. 1A to 1C are partial cross-sectional views illustrating the processing order in a method for manufacturing a column member of a steering column of a first example of an embodiment of the present invention.
Figure 1B:
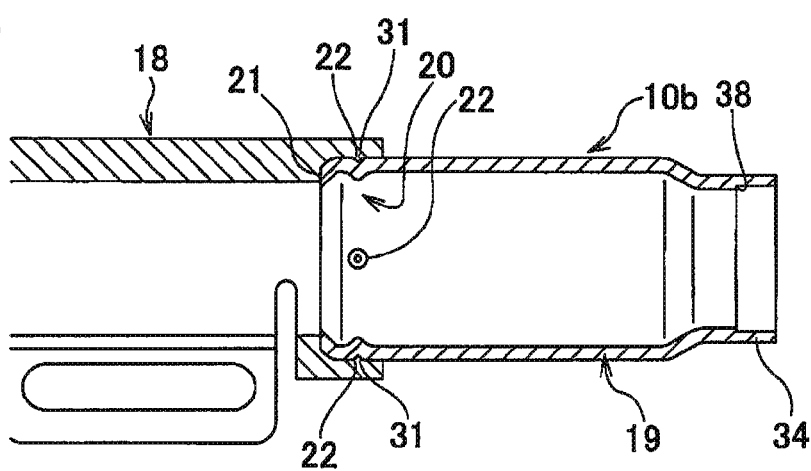

In order to manufacture the steering column of this example, by performing a drawing process on the tip-end section of the front-end section 20 of the cylindrical member 19, the inner diameter of the front-end surface 21 of the cylindrical member 19, which is the end surface of the other-side end section, is made smaller than the portion of the front-end section 20 of the cylindrical member 19 that constitutes the joining section between the main body portion 18 and the cylindrical member 19, or in other words, is smaller than the portion of the front-end section 20 of the cylindrical member 19 where the drawing process was not performed. This portion includes a portion of the front-end section 20 of the cylindrical member 19 that is located on the inner-diameter side of the portion where the rear-end surface is formed, which is the end surface on the one side of the main body portion 18 (portion where the inside end surface of the mold 23 (left side surface of the tip-end section of the mold 23 in FIG. 1) is located during casting described later), and the portion of the front-end section of the cylindrical member 19 where a concave section 22 is formed on the outer circumferential surface. In this example, a concave section 22 is provided by performing a pressing process at a plurality of locations (four locations in the example in the figure) in the circumferential direction of the outer circumferential surface of the front-end section 20 of the cylindrical member 19. As illustrated in FIG. 1A, the front-end section 20 of the cylindrical member 19 is inserted into and fitted inside an insertion hole 25 that is opened in the end surface 24 (right-side surface of the tip-end section of the mold 23 in FIG. 1), which is the end surface on the one side of the mold 23, and the front-end section 20 of the cylindrical member 19 protrudes into the mold 23. The shape of the inner circumferential surface, that defines the insertion hole 25 of the mold 23, matches the outer shape of the main body portion 18 that is obtained by the manufacturing method of this example.

Figure 2A:
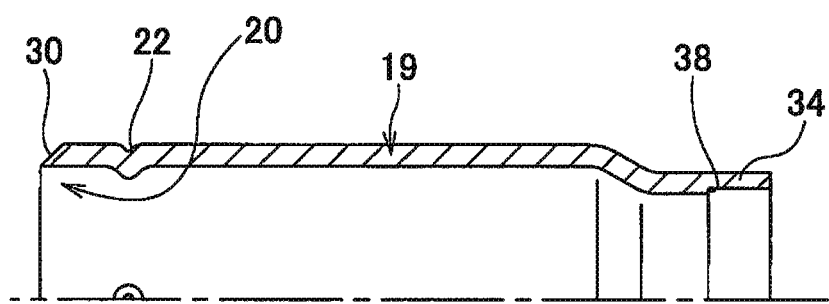
FIG. 2A is an upper half cross-sectional view of a cylindrical member that is taken from the first example, and illustrates a state before performing a drawing process on the front-end section.
Figure 2B:
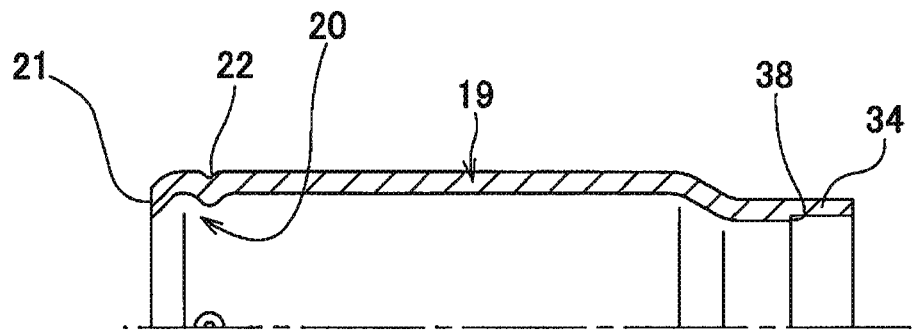
FIG. 2B is an upper half cross-sectional view of the cylindrical member illustrated in FIG. 2A, and illustrates a state after processing a drawing process on the front-end section.

Then, a core 26 is inserted inside the insertion hole 25 of the mold 23 from the other side (opposite side in the axial direction form the end surface 24), and the tip-end section 27, which is the one-side end section of the core 26, is inserted into and fitted inside the front-end section 20 of the cylindrical member 19. When doing this, a stepped surface 29 that is provided between the tip-end section 27 and base-end section 28 of the core 26 comes in contact with the front-end surface 21 of the cylindrical member 19. Therefore, the internal space of the mold 23 is defined by the inner circumferential surface and inner side surface of the mold 23, the front-end surface 21 of the front-end section 20 and the outer circumferential surface of the cylindrical member 19, and the outer circumferential surface of the core 26. In this example, the front-end surface 21 of the cylindrical member 19 is an opposing surface that comes in contact with the stepped surface 29 of the core 26, so as illustrated in FIG. 2A, in the state before the drawing process is performed on the front-end section of the cylindrical member 19, a tapered surface section 30 that is inclined in a direction such that the outer-diameter dimension becomes smaller going toward the front end is provided on the outer peripheral edge on the tip end of the front-end section 20 of the cylindrical member 19. As illustrated in FIG. 2B, by performing a drawing process on the tip-end section of the front-end section 20 of the cylindrical member 19 that is provided with this kind of tapered surface 30, the front-end surface 21 of the cylindrical member 19 becomes a surface that is parallel with the stepped surface 29, and the inner peripheral edge around the tip-end section of the front-end section 20 protrudes inward in the radial direction (the inner diameter of the front-end surface 21 of the cylindrical member 19 becomes smaller than the inner diameter of a portion of the front-end section 20 of the cylindrical member 19 that is located on the inner diameter side of a portion where the rear-end surface of the main body portion 18 is formed, and becomes smaller than the inner diameter of the portion where the concave section 22 is formed on the outer circumferential surface thereof).

By feeding molten light alloy such as aluminum alloy, magnesium alloy or the like into the mold 23 in a state in which the stepped surface 29 of the core 26 is in contact with the front-end surface 21 of the cylindrical member 19, the rear-end section of the main body portion 18 and the front-end section 20 of the cylindrical member 19 are joined in the axial direction, and the main body portion 18 is formed. At this time, by feeding part of the molten metal into the concave section 22 of the cylindrical member 19, a convex section 31 is formed on the inner circumferential surface of the rear-end section of the main body portion 18. In this example, the joined section between the rear-end section of the main body portion 18 and the front-end section of the cylindrical member 19 are formed by fitting these portions together and by engaging the concave section 22 and convex section 31. However, construction in which the joined section is formed by only one of these is also included in the present invention. In order to insert the inner shaft into the inner-diameter side of the cylindrical member 19 so as to be able to rotate freely, a rolling bearing 33 (see FIG. 13) is provided at the rear-end section of the cylindrical member 19. Therefore, in this example, a small-diameter section 34 is provided by performing a drawing process on the rear-end section of the cylindrical member 19, a stepped section 38 is provided by performing a machining process on the inner circumferential surface of this small-diameter section 34, and the outer ring of the rolling bearing 33 is fitted and fastened inside the stepped section 38.

After the outer column 10*b* that was obtained by forming the main body portion 18 is removed from the mold 23, a machining process is performed on the inner peripheral edge of the tip-end section of the front-end section 20 of the cylindrical member 19 that protrudes further inward in the radial direction than the inner circumferential surface of the main body portion 18, and the inner diameter of the cylindrical member 19 of at least the portion near the front end (portion except for the small-diameter section 34 that was formed for fitting and fastening the outer ring of the rolling-bearing 33 for inserting the inner shaft into the inner-diameter side of the outer column 10b so as to be able to rotate freely) is made to be equal to or greater than the inner diameter of the portion of the main body portion 18 that is separated in the axial direction from the joined section between the main body portion 18 and the cylindrical member 19 (portion that is fitted around the outside of the front-end section 20 of the cylindrical section 19). A machining process can be performed on the portion of the main body portion 18 on the inner-diameter side of the portion that is adjacent in the axial direction to the joined section until the inner diameter of the main body portion 18 of the portion that is separated in the axial direction from the joined section is within the range of being equal to or less than the inner diameter of the portion near the front end of the cylindrical member 19. By performing this kind of machining process, a forward facing stepped surface between the inner circumferential surface of the main body portion 18 through which the inner column 32 is passed through and the front-end edge of the cylindrical member 19 is eliminated such that displacement in the forward direction of the outer column 10b during a secondary collision can be performed smoothly, and thus it is possible to more completely protect the driver during a collision accident. Moreover, performing a machining process on the inner-diameter side portion of the rear-end section of the main body portion 18 that is adjacent to the joined section is done for convenience in order to simplify processing, and this kind of machining process can substantially be evaluated as being a machining process that is performed only on the inner peripheral edge of the front-end section of the cylindrical member 19. In this example, the diameter of the inscribed circle of the protrusions in the portion on the inner circumferential surface of the front-end section 20 of the cylindrical member 19 that corresponds to the concave sections 22 is taken beforehand to be equal to or greater than the inner diameter of the portion of the main body portion 18 that is separated in the axial direction from the joined section between the main body portion 18 and the cylindrical member 19, so regardless of whether or not a machining process is performed on these protrusions, the tip ends of these protrusions do not protrude further inward in the radial direction than the inner circumferential surface of the main body portion 18.

In the case of the steering column of this example, it is possible to make the thickness of the rear half section of the outer column 10b of the steering column in which the steering lock apparatus 12 (see FIG. 13) is assembled thin, while at the same time ensure the strength thereof. In other words, the rear half section of the outer column 10b is composed of a cylindrical member 19 that is made of an iron alloy, which is easy to ensure strength. Therefore, even though the thickness of the cylindrical member 19 that forms the rear half section is made thin, up to 0.4 to 0.75 times, preferably 0.5 to 0.7 times that of the thickness of the main body portion 18 in order to install the lock unit 13 or key-lock collar 15, or even though a lock through hole 17 for inserting the lock pin 16 is provided, it is possible to ensure the strength of the outer column 10b including the cylindrical member 19. On the other hand, the portion other than the cylindrical member 19 of the steering column including the column member (the main body portion 18 of the outer column 10b and the inner column) is made of a light alloy such as an aluminum alloy, magnesium alloy or the like, and the thickness of the cylindrical member 19 is thin, so there is no excessive increase in the weight of the steering column.

Moreover, the concave section 22 that is formed on the outer circumferential surface of the front-end section 20 of the cylindrical member 19 engages with the convex section 31 that is formed on the inner circumferential surface of the rear-end section of the main body portion 18, so it is possible to ensure the joint strength in the axial direction between the main body portion 18 and the cylindrical member 19. Furthermore, in the circumferential direction as well, with the lock pin 16 engaged with the engagement concave section 14 of the key-lock collar 15, it is possible to improve the torsion rigidity of the joined section between the main body portion 18 and cylindrical member 19 due to the engagement between the concave section 22 and convex section 31 even when a large force is applied in an attempt to rotate the steering wheel 4. Instead of the concave section 22 that is recessed inward in the radial direction on the outer circumferential surface of the front-end section 20 of the cylindrical member 19, it is possible to provide a convex section that protrudes outward in the radial direction to engage with a concave section that is provided on the inner circumferential surface of the rear-end section of the main body portion 18.

Figure 3A:
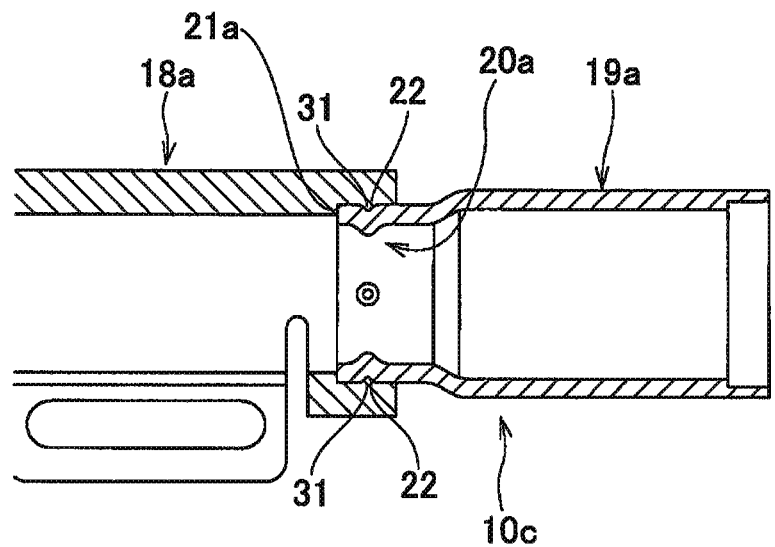
FIGS. 3A and 3B are cross-sectional views for explaining problems that occur when the manufacturing method of the present invention is not performed.
Figure 3B:
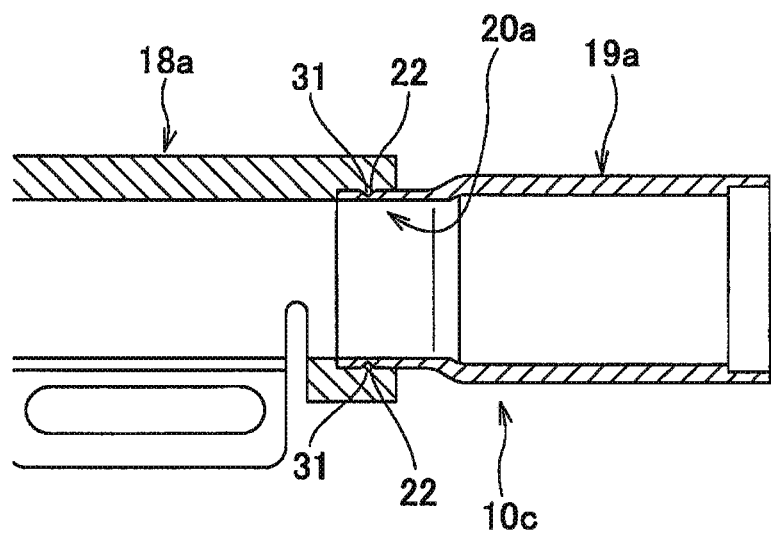

A drawing process is performed on the tip-end section of the front-end section 20 of the cylindrical member 19, and with the inner diameter of the front-end surface 21 of the cylindrical member 19 less than the inner diameter of the portion of the front-end section 20 of the cylindrical member 19 that is located on the inner-diameter side of the portion where the rear-end surface of the main body portion 18 is formed, the main body portion 18 is formed by casting. Therefore, it is possible to effectively ensure the strength of the joined section between the main body portion 18 and the cylindrical member 19. The advantage of forming the main body portion 18 in a state in which the inner diameter of the front-end surface 21 of the cylindrical member 19 is less than the inner diameter of the portion of the cylindrical member 19 that is located on the inner-diameter side of the portion where the rear-end surface of the main body portion 18 is formed, will be explained using FIGS. 3A and 3B in addition to FIGS. 1A to 1C. FIGS. 3A and 3B illustrate a reference example of manufacturing an outer column 10 in which the main body portion 18a and cylindrical member 19a are joined in the axial direction without making the inner diameter of the front-end surface of the cylindrical member 19a smaller than the inner diameter of the portion of the cylindrical member 19a that is located on the inner-diameter side of the portion where the rear-end surface of the main body portion 18a is formed, and in which the inner diameter of the cylindrical member 19a is equal to or greater than the inner diameter of the main body portion 18a. As explained in FIGS. 1A to 1C, in order to prevent leakage of molten metal when casting the main body portion 18, 18a, an opposing surface for the stepped surface 29 of the core 26 to come in contact with is required. In the present invention, the inner diameter of the front-end surface 21 of the cylindrical member 19, which is the opposing surface, is made to be smaller than the inner diameter of the portion of the cylindrical member 19 that is located on the inner-diameter side of the portion where the rear-end surface of the main body portion 18 is formed, and is made to be smaller than the inner diameter of the portion where the concave section 22 is formed on the outer circumferential surface thereof.

In this reference example, the inner diameter of the front-end surface 21a of the cylindrical member 19a is the same as the inner diameter of the portion of the cylindrical member 19a that is located on the inner-diameter side of the portion where the rear-end surface of the main body portion 18a is formed. Under this kind of condition, as illustrated in FIG. 3A, the inner circumferential surface of the portion near the rear end of the main body portion 18a engages with the outer circumferential surface of the portion near the front end of the cylindrical member 19a, and the main body portion 18a is formed by casting. Next, in order for the inner diameter of the cylindrical member 19a to be equal to or greater than the inner diameter of the main body portion 18a, as illustrated in FIG. 3B, a machining process is performed on the inner-diameter side portion of the front-end section 20a of the cylindrical member 19a in the joined section between the main body portion 18a and the cylindrical member 19a. When performing this machining process, the inner diameter of the front-end surface 21a of the cylindrical member 19a is not smaller than the inner diameter of the portion of the cylindrical member 19a that is located on the inner-diameter side of the portion where the rear-end surface of the main body portion 18a is formed, so not only the portion on the inner-diameter side of the joined section between the main body portion 18a and the cylindrical member 19a (portion where the rear-end surface of the main body portion is formed) of the cylindrical member 19a, but also the portion on the inner-diameter side of the portion that is located further on the rear-end side than this joined section is cut away. The thickness of the cylindrical member 19a is thin, so when the portion on the inner-diameter side of the portion near the front end thereof is cut away, the thickness of the cylindrical member 19a becomes too thin in the portion that is located in the joined section and further on the rear-end side than the joined section, and thus it is not possible to ensure joint strength of the joined section or to ensure the torsion strength and bending strength of the portion that is located further on the rear-end side than the joined section.

Figure 1C:
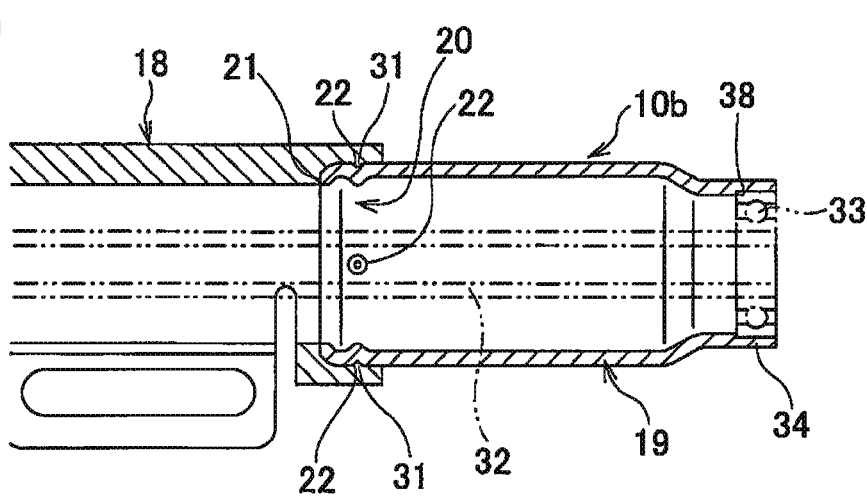

On the other hand, in the construction of the first example, when performing a machining process on the portion on the inner-diameter side of the joined section between the main body portion 18 and the cylindrical member 19, the portions where this machining process is performed are only the peripheral edge of the tip-end section of the front-end section 20 of the cylindrical member 19, and the portion of the inner-diameter side portion of the main body portion 18 that is adjacent to the joined section between the main body portion 18 and the cylindrical member 19. Except for the tip-end section of the front-end section 20, it is not necessary to machine away the joined section, including the portion of the cylindrical member 19 that is located further on the rear-end side than the joined section. Therefore, as illustrated in FIG. 1C, it is possible to sufficiently ensure the strength of the joined section between the main body portion 18 and the cylindrical member 19, and the torsion strength and bending strength of the cylindrical member 19 even in a state in which the inner peripheral edge of the tip-end section of the front-end section 20 of the cylindrical member 19 has been machined away.

Moreover, a machining process is performed on the inner peripheral edge of the tip-end section of the front-end section 20 of the cylindrical member 19, and the inner diameter of the portion near the front end of the cylindrical member 19 is equal to or greater than the inner diameter of the portion of the main body portion 18 that is separated in the axial direction from the joined section. The cylindrical inner column 32 is fitted inside the front-end section (left-end section in FIGS. 1A to 1C) of this kind of outer column 10b in a state such that displacement in the axial direction is possible, to construct an expandable and contractible steering column. The inner diameter of the outer column 10b becomes larger from the front side (left side in FIGS. 1A to 1C) in the order of the main body portion 18 and cylindrical member 19, so when the outer column 10b displaces forward in the axial direction relative to the inner column 32 due to forward-backward position adjustment of the steering wheel, or due to a secondary collision, it is possible to suppress the possibility that the rear-end edge of the inner column 32 interferes with the portion that protrudes from the inner circumferential surface of the outer column 10b, and thus displacement in the forward direction of the steering wheel will be obstructed. The position in the axial direction of the small-diameter section 34 is such that the rear-end edge of the inner column 32 does not interfere with the inner circumferential surface of the small-diameter section 34 even when a secondary collision advances.

Moreover, during manufacturing, the inner diameter of the front-end surface 21 of the cylindrical member 19 is made to be less than the portion of the cylindrical member 19 that is located on the inner-diameter side of the portion where the rear-end surface of the main body portion 18 is formed, so when forming the main body portion 18 by feeding molten light alloy into the mold 23, the molten metal is not fed into the inner circumferential side of the cylindrical member 19, and the inner circumferential surface of the cylindrical member 19 is prevented from becoming a rough surface due to light alloy adhering to the surface.

Second Example to Fourth Example

FIGS. 4A(a to c) and 4B(a to c) illustrate second to fourth examples of an embodiment of the present invention. In the figures from FIG. 4A(a) to FIG. 4B(c), the states before processing the tip-end section of the front-end section 20 are illustrated in FIGS. 4A(a to c), and the states after the processing are illustrated in FIG. 4B(a to c). In these examples, the shape of the cylindrical member 19b to 19d differs from that in the first example. First, in the case of the second example illustrated in FIGS. 4A(a) and 4B(a), in the state before a drawing process is performed on the tip-end section of the front-end section 20 of the cylindrical member 19b, there is no tapered surface section 30 (see FIGS. 2A and 2B) such as provided in the first example. Therefore, when the drawing process is performed on the tip-end section of the front-end section 20 of the cylindrical member 19b, the front-end edge of the cylindrical member 19b becomes a shape in which the middle section in the radial direction is pointed toward the front. There is no particular problem in this case as long as the dimension in the radial direction of the stepped surface 29 of the core 26 (see FIGS. 1A to 1C) is sufficiently large. It is also possible to make the front-end surface of the cylindrical member 19b into a surface that is parallel with the stepped surface 29 by performing a machining process on the front-end edge after performing the drawing process on the tip-end section of the front-end section 20 of the cylindrical member 19b.

In the case of the third example illustrated in FIG. 4A(b) and FIG. 4B(b), by performing a drawing process on the tip-end section of the front-end section 20 of the cylindrical member 19c, a small-diameter section 35, having an inner diameter that is smaller than the portion of the cylindrical member 19c that is located on the inner-diameter side of the portion where the rear-end surface of the main body portion 18 is formed, is provided on the tip-end section of the front-end section 20. Moreover, in the fourth example illustrated in FIG. 4A(c) and FIG. 4B(c), by performing a bending process on the tip-end section of the front-end section 20 of the cylindrical member 19d, an inward facing flange-shaped circular-ring section 36 is provided on the front-end edge of the cylindrical member 19d. Except for the differences in the shapes of the tip-end sections of the front-end section 20 of the cylindrical members 19b to 19d, the other construction and functions are the same as in the first example.

Fifth Example

Figure 5A:
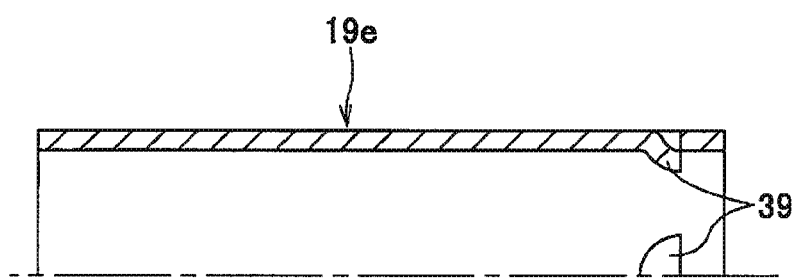
FIGS. 5A and 5B illustrate a fifth example of an embodiment of the present invention, and correspond to FIGS. 2A and 2B.
Figure 5B:
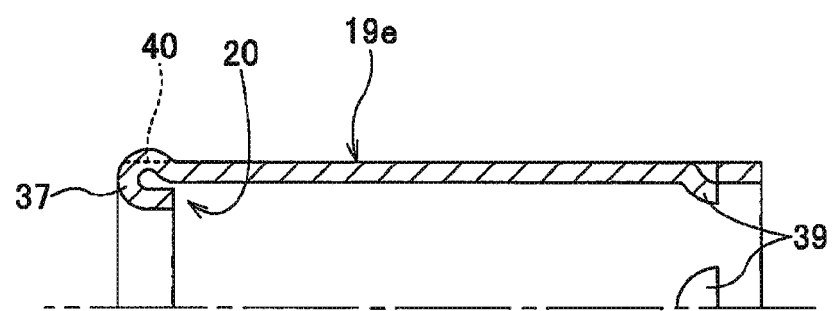
Figure 6A:
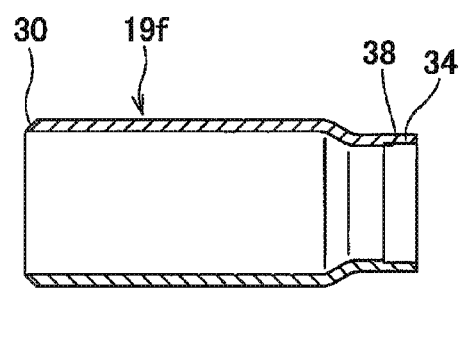
FIG. 6A illustrates a sixth example of an embodiment of the present invention and corresponds to FIG. 2A.
Figure 6B:
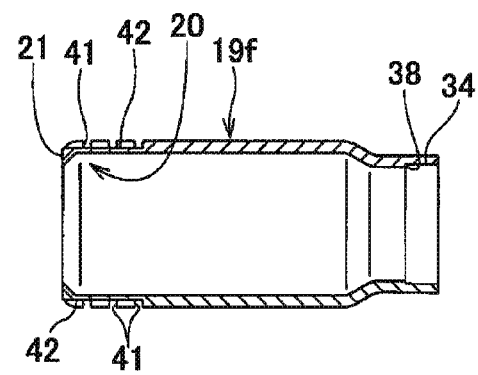
FIG. 6B is of the sixth example, and is a drawing that corresponds to FIG. 2B.
Figure 6C:
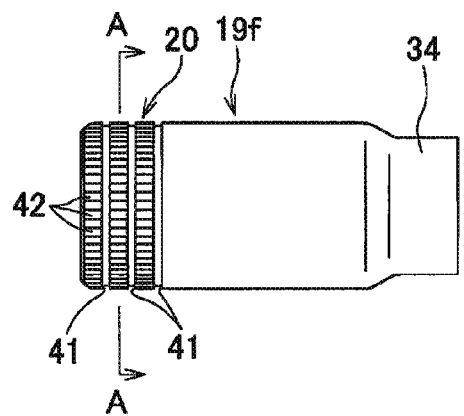
FIG. 6C is a side view of the cylindrical member that is illustrated in FIG. 6B.
Figure 6D:
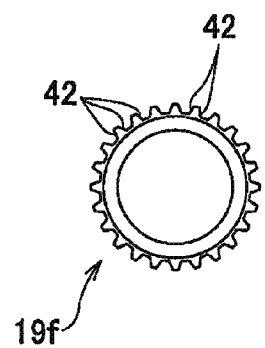
FIG. 6D is a cross-sectional drawing of section A-A in FIG. 6C.
Figure 7A:
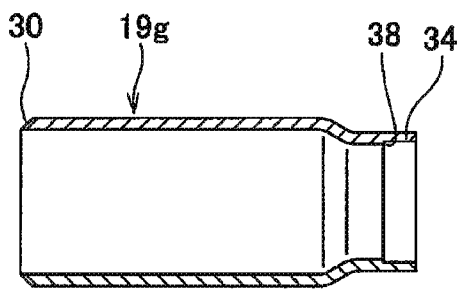
FIGS. 7A to 7D illustrate a seventh example of an embodiment of the present invention, and correspond to FIGS. 6A to 6D.
Figure 7B:
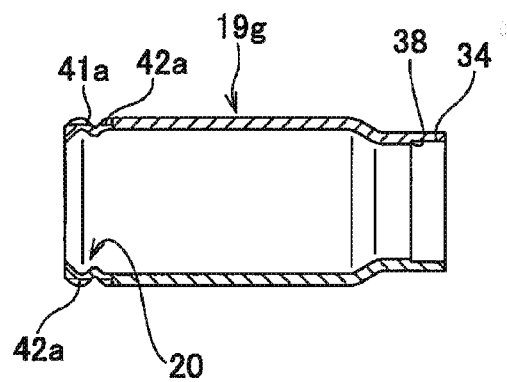
Figure 7C:
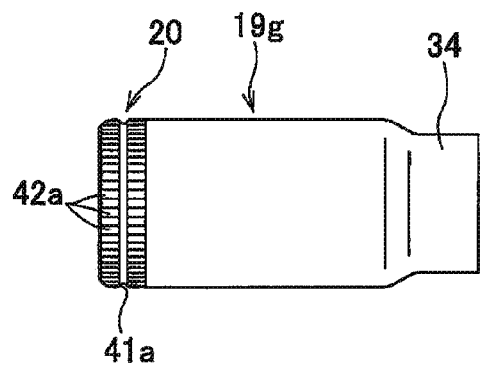
Figure 7D:
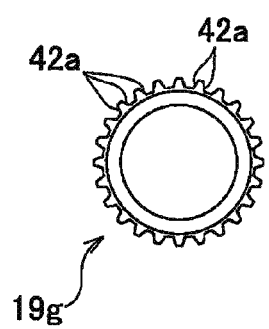
Figure 8A:
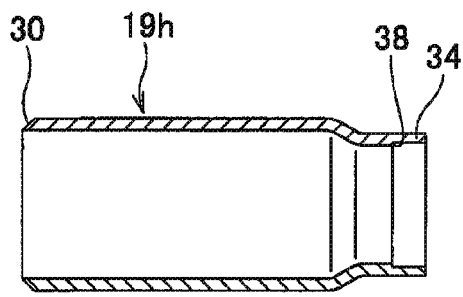
FIGS. 8A to 8D illustrate an eighth example of an embodiment of the present invention, and correspond to FIGS. 6A to 6D.
Figure 8B:
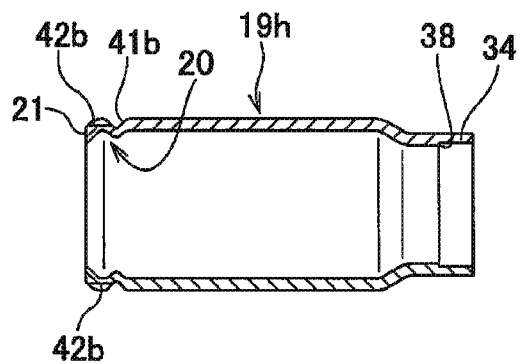
Figure 8C:
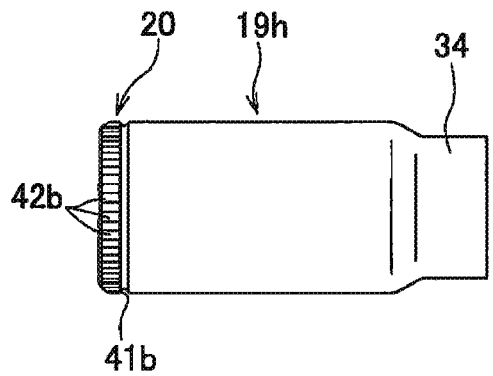
Figure 8D:
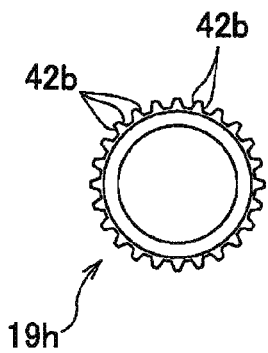

FIGS. 5A and 5B illustrate a fifth example of an embodiment of the present invention. In this example, by bending the entire front-end edge of the cylindrical member 19e into a shape having a circular arc shaped cross section, a protruding piece section 37, whose inner diameter thereof is less and the outer diameter thereof is larger than the inner-diameter side portion where the rear-end surface of the main body portion 18 is formed (see FIGS. 1A to 1C). Moreover, a cut-out section 40 is provided in at least one location in the circumferential direction of the portion near the outer diameter of the protruding piece section 37. When casting the main body portion 18, the stepped surface 29 of the core 26 (see FIGS. 1A and 1B) comes in contact with the protruding piece section 37. The half section on inner-diameter side of the protruding piece section 37 is cut and removed after casting of the main body portion 18. In the sate after casting of the main body portion 18, the joint strength in the axial direction is ensured by the engagement between the half section on the outer-diameter side of the protruding piece section 37 and the main body portion 18. Furthermore, the joint strength in the circumferential direction is ensured by the engagement between the cut-out section 40 of the half section on the outer-diameter side of the protruding piece section 37 and the main body portion 18 that enters inside of the cut-away section 40.

In this example, in order to provide the outer ring of the rolling bearing 33 (see FIG. 13) on the inner-diameter side of the cylindrical member 19e, a fastening section 39 that protrudes toward the inner circumferential surface of the cylindrical member 19e is provided by performing a pressing process at plural locations in the circumferential direction on the rear-end section of the cylindrical member 19e, and the outer ring of the rolling bearing 33 is fastened to the fastening section 39. The construction and function of the other parts are the same as in the first example.

Sixth Example

FIGS. 6A to 6D illustrate a sixth example of an embodiment of the present invention. In this example, concave grooves 41 that are formed in the circumferential direction around the entire circumference are provided at a plurality of locations (three locations in the figures) in the axial direction of the outer circumferential surface of the front-end section 20 of the cylindrical member 19f. Moreover, concave grooves 42 that extend in the axial direction are provided at a plurality of locations in the circumferential direction of the outer circumferential of the front-end section 20 of the cylindrical member 19f. A drawing process is performed on the tip-end section of the front-end section 20 of the cylindrical member 19f to increase the rigidity, so large elastic deformation of the outer circumferential surface of the front-end section 20 of the cylindrical member 19f, which is a processed part, is suppressed. Therefore, for example, when forming the concave grooves 41 in the circumferential direction on the outer circumferential surface of the front-end section 20 of the cylindrical member 19f by a turning process, and forming the concave grooves 42 in the axial direction by a machining process, it is possible to form the concave grooves 41 in the circumferential direction and the concave grooves 42 in the axial direction easily and highly precisely. Moreover, when forming the cylindrical member 19f by cutting a long pipe material into a specified length by a turning process, it is also possible to form the concave grooves 41 in the circumferential direction in the same process without removing a chuck by performing a so-called one-chuck turning process. In this case, it is possible to reduce the manufacturing cost by reducing the manufacturing processes.

When placing the cylindrical member 19f into the mold 23 and forming the main body portion 18 (see FIGS. 1A to 1C) by feeding molten light alloy, part of the molten metal is fed into the concave grooves 41 in the circumferential direction and concave grooves 42 in the axial direction, thus forms protrusions in the circumferential direction on the inner circumferential surface and protrusions in the axial direction on the outer circumferential surface of the rear-end section of the main body portion 18. In this example, the joint strength in the axial direction between the main body portion 18 and the cylindrical member 19f is ensured by the engagement between the concave grooves 41 in the circumferential direction and the protrusions in the circumferential direction, and the torsion rigidity of the main body portion 18 and the cylindrical member 19f is ensured (relative rotation of these members is prevented) by the engagement between the concave grooves 42 in the axial direction and the protrusions in the axial direction. This example can be implemented in combination with the construction of one of the second example to fourth example. The construction and functions of the other parts are the same as in the first example.

Seventh Example

FIGS. 7A to 7D illustrate a seventh example of an embodiment of the present invention. In this example, of the outer circumferential surface of the front-end section of the cylindrical member 19g, a concave groove 41a in the circumferential direction is provided around the entire circumference at one location in the middle section in the axial direction of concave grooves 42a that are provided at a plurality of locations in the circumferential direction. This kind of concave groove 41a in the circumferential direction is formed by performing a rolling process or pressing process that presses and plastically deforms the outer circumferential surface of the front-end section 20 of the cylindrical member 19g inward in the radial direction. Moreover, the concave grooves 42a in the axial direction are formed by performing a rolling process or drawing process on the front-end section 20 of the cylindrical member 19g. By forming the concave groove 41a in the circumferential direction and concave grooves 42a in the axial direction by plastic deformation, it is possible to keep the reduction in the plate thickness of the processed portion small, and thus cutting of the fiber flow (fiber-shaped metal structure) is prevented. Therefore, the rigidity of the cylindrical member 19g at the joined section between the main body portion 18 (see FIGS. 1A to 1C) and the cylindrical member 19g is ensured even when the plate thickness of the cylindrical member 19g is thin.

Moreover, when performing the drawing process on the tip-end section of the front-end section 20 of the cylindrical member 19g, it is possible to form the concave grooves 42a in the axial direction at the same time by a drawing process. In this case, it is possible to reduce the manufacturing cost by reducing the manufacturing processes. When forming the concave groove 41a in the circumferential direction by a pressing process and forming the concave grooves 42a in the axial direction by a drawing process, the diameter of the inscribed circle of protrusions that are located in portions on the inner circumferential surface of the front-end section 20 of the cylindrical member 19f that correspond to the concave groove 41a in the circumferential direction and concave grooves 42a in the axial direction is equal to or greater than the inner diameter of the portion of the main body portion 18 that is separated from the joined section between the main body portion 18 and the cylindrical member 19, and the tip-end sections of these protrusions do not protrude further inward in the radial direction than the inner circumferential surface of the main body portion 18. The construction and function of the other parts are the same as in the sixth example.

Eighth Example

FIGS. 8A to 8D illustrate an eighth example of an embodiment of the present invention. In this example, of the outer circumferential surface of the front-end section 20 of the cylindrical member 19h, concave grooves 42b are provided at a plurality of locations in the circumferential direction, and a concave groove 41b in the circumferential direction is provided around the entire circumference at one location in the portion that is adjacent to the rear side in the axial direction of the portion where the concave grooves 42b in the axial direction are formed. The construction and function of the other parts are the same as in the seventh example.

Ninth Example

Figure 9A:
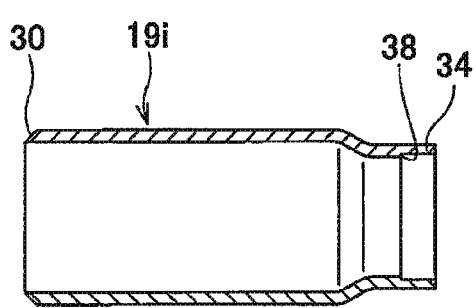
FIGS. 9A to 9D illustrate a ninth example of an embodiment of the present invention, and correspond to FIGS. 6A to 6D.
Figure 9B:
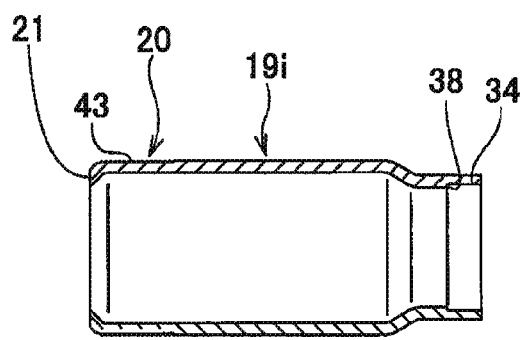
Figure 9C:
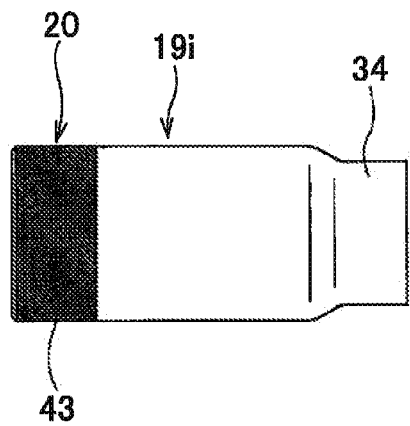
Figure 9D:
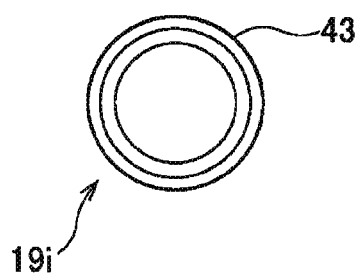

FIGS. 9A to 9D illustrate a ninth example of an embodiment of the present invention. In this example, a rough surface section 43 is provided on the outer circumferential surface of the front-end section 20 of the cylindrical member 19i by performing a knurling process on the outer circumferential surface of the front-end section 20 of the cylindrical member 19i. The knurling pattern that is formed by this knurling process can be a flat pattern (straight pattern), or an inclined pattern (spiral pattern), however, as illustrated in FIG. 9C, preferably a twill pattern is formed in which small concave grooves that are inclined in both the circumferential direction and axial direction (the inclination angle with respect to the axial direction is 10° to 80°, preferably 30° to 60°, and most preferably 45°) cross in a net-like pattern. In other words, by forming a twill shaped knurling pattern, in addition to increasing the torsion rigidity of the cylindrical member 19i and the main body portion 18 (see FIGS. 1A to 1C) and being able to prevent relative rotation between the cylindrical member 19i and the main body portion 18, the joint strength in the axial direction between the cylindrical member 19i and the main body portion 18 is increased, and it is possible to prevent the cylindrical member 19i from falling out from the main body portion 18.

The knurling pattern can be formed by a rolling process, however, preferably is formed by a machining process. In other words, when forming a knurling pattern on the outer circumferential surface of the front-end section of the cylindrical member 19i, which is a pipe material having a thin thickness, using a rolling process, there is a possibility that the outer circumferential surface of the front-end section of the cylindrical member 19i, where the rolling process is performed, will deform (warp). On the other hand, by forming a knurling pattern by a machining process, deformation of the portion where machining process is performed is prevented, and the rough surface section 43 can be formed easily and highly precisely. As a method for forming the knurling pattern with this kind of machining process, for example, Quick Knurling by Yamada Engineering Co., Ltd. can be employed.

In the ninth example, a rough surface section 43 for preventing relative rotation between the cylindrical member 19i and the main body portion 18 and for preventing the cylindrical member 19i from falling out of the main body portion 18 is formed by a knurling process, so it is possible to ensure the plate thickness of the cylindrical member 19i at the joined section between the main body portion 18 and the cylindrical member 19i, and ensure the rigidity of the joined section. In other words, when a concave groove 41 in the circumferential direction is formed by a turning process, and concave grooves 42 in the axial direction are formed by a machining process as in the case of the sixth example, if the plate thickness of the cylindrical member 19 is not sufficiently thick, the plate thickness of the cylindrical member 19 at the joined section between the main body portion 18 and the cylindrical member 19 will become thin, and there is a possibility that the rigidity of the joined section will not be sufficiently ensured. However, in this example, by forming a knurling pattern that is composed of numerous shallow infinitesimal concave grooves on the outer circumferential surface of the front-end section 20 of the cylindrical member 19i, relative rotation and falling out is prevented. The construction and function of the other parts is the same as in the first example.

Tenth Example

Figure 10:
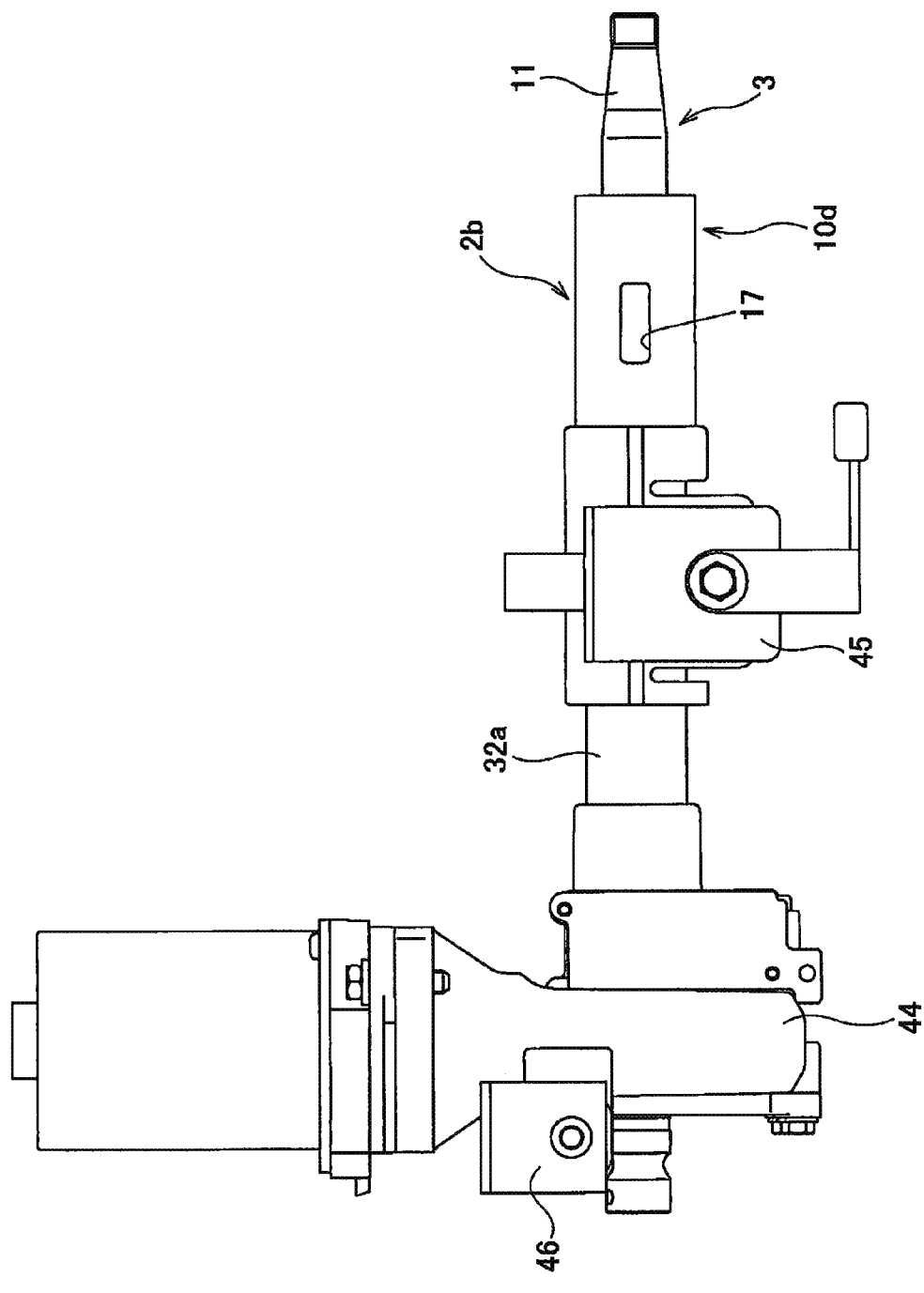
FIG. 10 is a side view illustrating a steering apparatus of a tenth example of an embodiment of the present invention.
Figure 11:
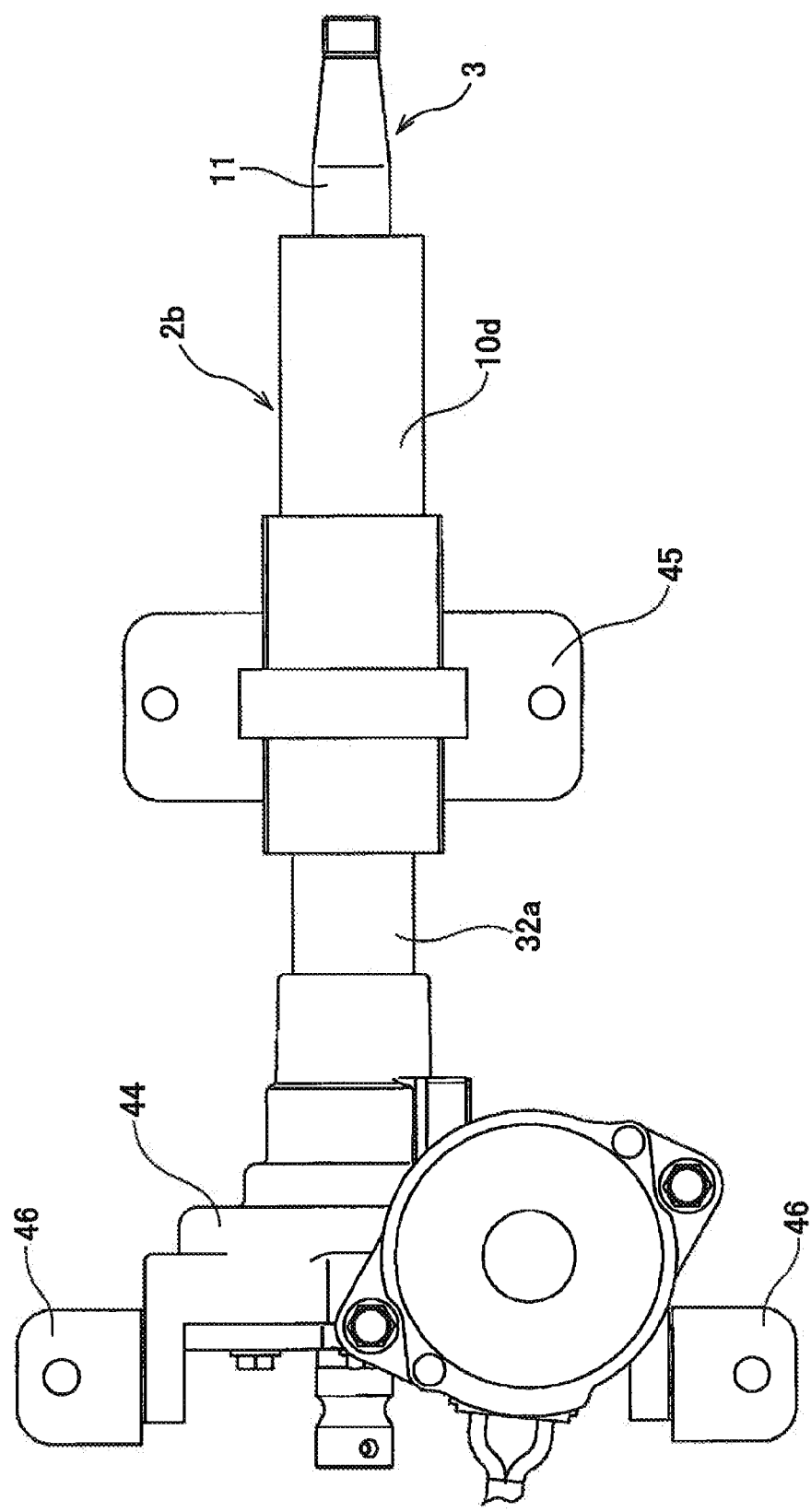
FIG. 11 is a top view as seen from above in FIG. 10.

FIG. 10 and FIG. 11 illustrate a tenth example of an embodiment of the present invention. This example is an example of the steering apparatus of the present invention. This steering apparatus is an impact absorbing steering apparatus that comprises a telescopic mechanism. In this steering apparatus, the rear-end section of an inner column 32a is fitted inside the front-end section of an outer column 10d in a state in which both of the outer column 10d and inner column 32a are able to displace in the axial direction. A housing 44 for housing a reduction gear that comprises an electric power-steering apparatus is connected and fastened to the front-end section of the inner column 32a. This kind of steering column 2b is supported by the vehicle body connecting and fastening a rear-side bracket 45, which supports the outer column 10d, and a front-side bracket 46, which is provided on both the left and right side of the front-end section of the housing 44, to the vehicle body. In this example, a steering column that includes a column member of one of the first to ninth examples is used as the outer column 10b that comprises the steering column 2b.

Figure 12:
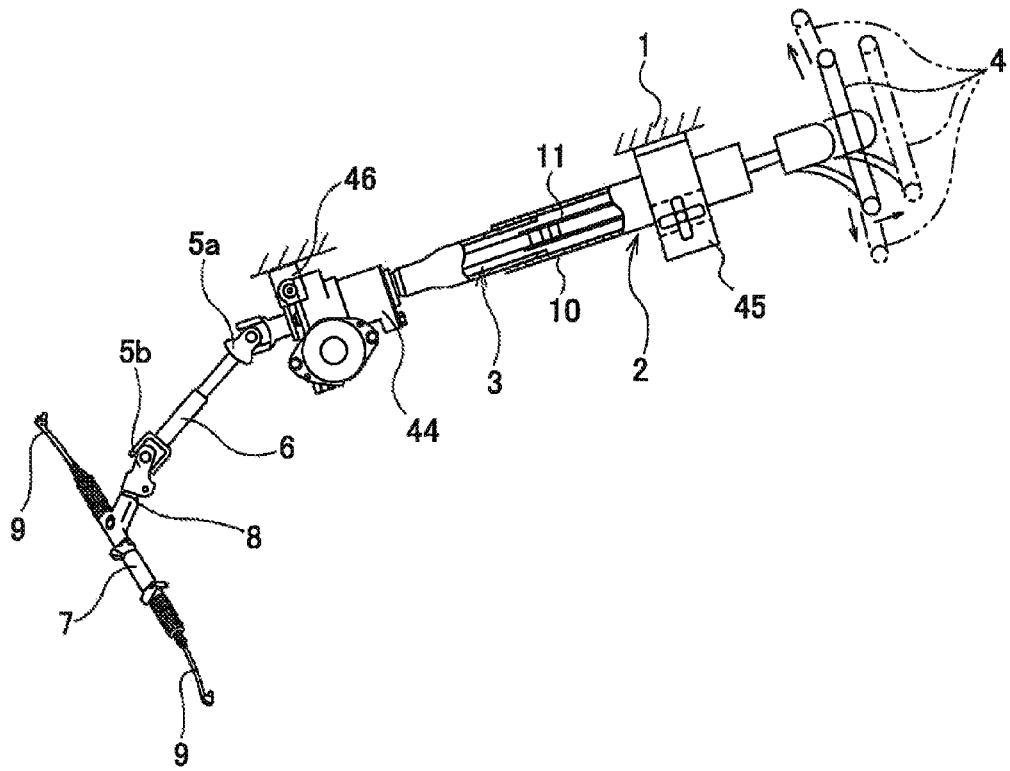
FIG. 12 is a perspective view of an example of a conventionally known steering apparatus, and illustrates a state in which part is cut away.
Figure 13:
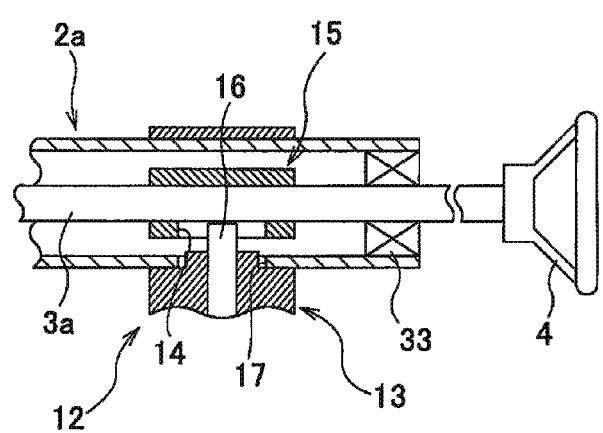
FIG. 13 is a simplified cross-sectional view illustrating an example of conventional construction of a steering lock apparatus.
Figure 14:
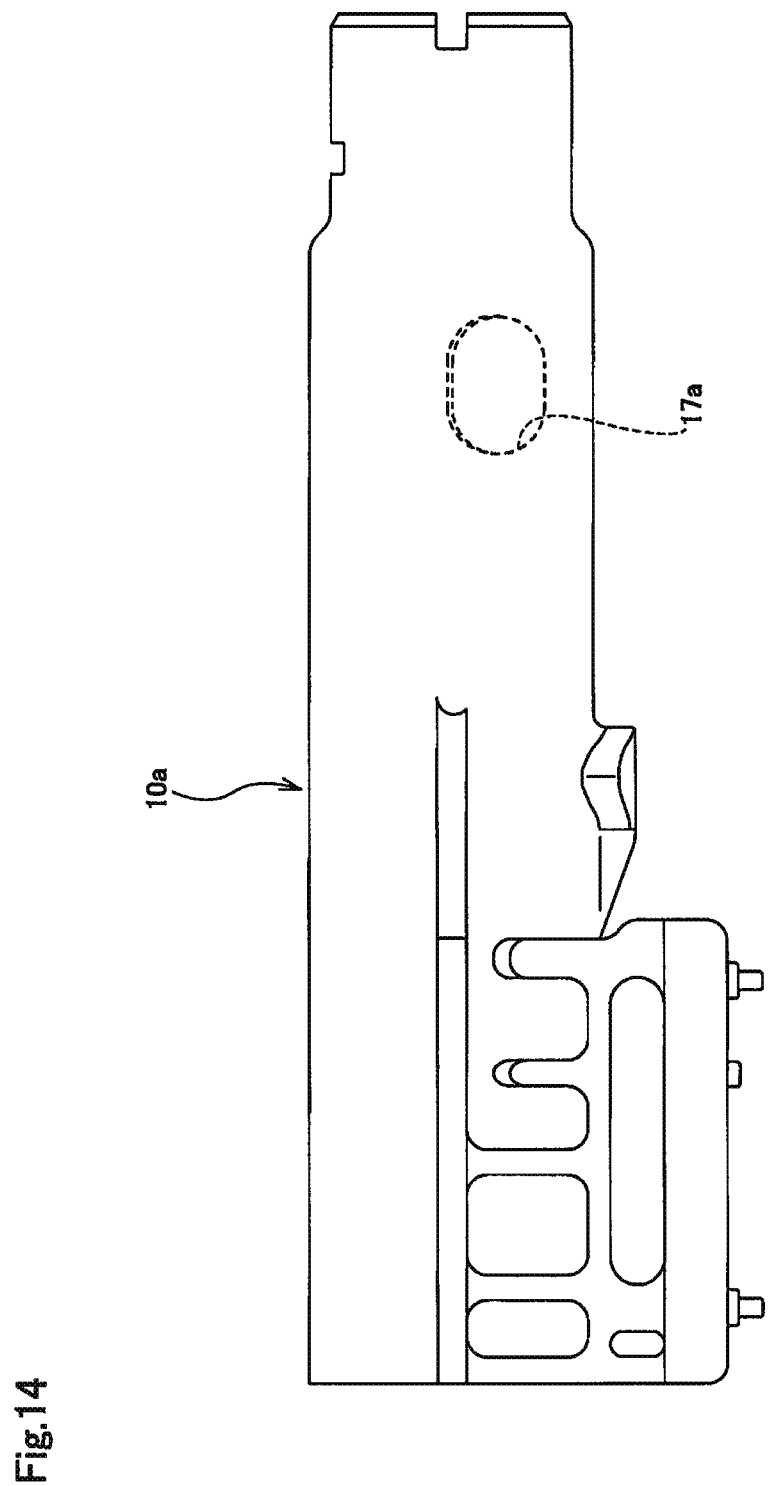
FIG. 14 is a side view illustrating an example of conventional construction of a steering column in which a lock through hole is provided.

Furthermore, a steering lock apparatus such as illustrated in FIG. 13 is assembled in the steering apparatus of this example. When the steering lock apparatus is operated, the steering shaft 3 is substantially prevented from rotating inside the steering column 2b. Being substantially prevented means that when the steering wheel 4 (see FIG. 12) is rotated with a specified force or greater, or specifically, with a force that is greater than a value specified by the key-lock regulation, in a state where the engagement concave section 14 is engaged with the tip-end section of the lock pin 16 (see FIG. 13) when the key is locked, the steering shaft 3 is allowed to rotate with respect to the key-lock collar 15 and the steering column 2b. However, the steering shaft 3 will not rotate by applying a force to the steering wheel 4 to the same degree as of the force applied in a normal driving position in order to apply a desired angle to the steered wheels. The column member of the present invention is not limited to the outer column of a steering column comprising a telescopic mechanism as described above, and can also be applied to a steering column that does not comprise a telescopic mechanism.

What is claimed is:

1. A steering column having an overall hollow and cylindrical shape, and comprising an outer column and an inner column fitted inside the outer column to relatively move in an axial direction of the steering column to the outer column, the outer column comprising:
   a main body portion made of a light metal alloy, the main body having one-side end section and another-side end section; and
   a cylindrical member made of an iron alloy, the cylindrical member having one-side end section and another-side end section, the cylindrical member being joined in an axial direction with respect to the main body portion with the other-side end section of the cylindrical member fitted inside and fastened to the one-side end section of the main body portion, an inner diameter of an end surface of the other-side end section of the cylindrical member being smaller than an inner diameter of a portion of the other-side end section of the cylindrical member, the portion of the other-side end section of the cylindrical member constituting a joined section between the main body portion and the cylindrical member; wherein
   the main body portion has a convex section or concave section on an inner circumferential surface of the one-side end section of the main body portion, and the cylindrical member has a concave section or convex section that is fitted inside and engages with the convex section or concave section of the main body portion on an outer circumferential surface of the other-side end section of the cylindrical member.

2. The steering column according to claim 1, wherein the concave section, which is formed in either the main body or the cylindrical member, is composed of a concave groove in the axial direction, the concave groove in the axial direction extending in the axial direction and provided in at least one location in the circumferential direction.

3. The steering column according to claim 1, wherein the concave section, which is formed in either the main body or the cylindrical member, is composed of a concave groove in a circumferential direction, the concave groove in the circumferential direction extending in the circumferential direction and provided in at least one location in the axial direction.

4. The steering column according to claim 1, wherein the concave section, which is formed in either the main body or the cylindrical member, is provided on the outer circumferential surface of the other-side end section of the cylindrical member.

5. The steering column according to claim 1, wherein an inner diameter of the other-side end section of the cylindrical member is equal to or greater than an inner diameter of the portion of the main body portion, the portion of the main body portion being separated in the axial direction from the joined section.

6. The steering column according to claim 1, wherein a drawing process or bending formation is performed on the tip-end section of the other-side end section of the cylindrical member to form an arc shape in the cross section, and a machining process is performed on the portion on the inner-diameter side of the tip-end section of the other-side end section of the cylindrical member.

7. The steering column according to claim 1, wherein a machining process is not performed on a portion of the other-side end section of the cylindrical member except for the tip-end section.

8. The steering column according to claim 1, wherein the cylindrical member has a lock through hole that is a component member of a steering lock apparatus at one location in a middle section in the axial direction of the cylindrical member.

9. A method for manufacturing the steering column of claim 1, comprising steps of:
   forming the concave section or convex section on the outer circumferential surface of the other-side end section of the cylindrical member;
   inserting the other-side end section of the cylindrical member through an insertion hole opened in one-side end surface of a mold such that the other-side end of the cylindrical member protrudes inside the mold;
   inserting the one-side end section of a core into the other-side end section of the cylindrical member; and
   feeding molten metal into the mold and forming the main body portion, forming the convex section or concave section on the inner circumferential surface of the one-side end section of the main body portion to join the one-side end section of the main body portion and the other-side end section of the cylindrical member in the axial direction via the joined section so as to obtain the outer column.

10. The method for manufacturing a steering column according to claim 9, further comprising steps of:
    forming the main body portion such that the inner diameter of the end surface of the other-side end section of the cylindrical member is smaller than the inner diameter of the portion of the main body portion separated in the axial direction from the joined section, and
    after forming the main body portion, performing a machining process on the portion on the inner-diameter side of the tip-end section of the other-side end section of the cylindrical member such that the inner diameter of another end surface of cylindrical member is equal to or greater than the inner diameter of the portion of the main body portion separated in the axial direction from the joined section.

11. The method for manufacturing a steering column according to claim 9, further comprising steps of:
    providing the concave section, which is formed in either the main body or the cylindrical member, on the outer circumferential surface of the other-side end section of the cylindrical member, and
    forming the convex section, which is formed in either the main body or the cylindrical member, on the inner circumferential surface of the one-side end section of the main body portion by feeding part of the molten metal into the concave section when forming the main body portion.

12. The method for manufacturing a steering column according to claim 11,
    wherein the concave section, which is provided on the outer circumferential surface of the other-side end section of the cylindrical member, is composed of a concave groove in the axial direction, the concave groove in the axial direction extending in the axial direction and provided in at least one location in a circumferential direction, and
    the method further comprises a step of forming the concave groove in the axial direction by a machining process.

13. The method for manufacturing a steering column according to claim 12 further comprising a step of
    performing a drawing process on the tip-end section of another-side end section of the cylindrical member before inserting the other-side end section of the cylindrical member through the insertion hole of the mold, and providing the concave groove in the axial direction on the outer circumferential surface of the other-side end section of the cylindrical member at the same time of making the inner diameter of the other-side end surface of the cylindrical member smaller than the inner diameter of the portion of the other-side end section of the cylindrical member, the portion of the other-side end section of the cylindrical member forming the joined section between the main body portion and the cylindrical member.

14. The method for manufacturing a steering column according to claim 11, wherein the concave section, which is provided on the outer circumferential surface of the other-side end of the cylindrical member, is composed of a concave groove in a circumferential direction, the concave groove in the circumferential direction extending in the circumferential direction and provided in at least one location in the axial direction, and the method further comprises a step of forming the concave groove in the circumferential direction by a turning process.

15. The method for manufacturing a steering column according to claim 11, wherein the concave section, which is provided on the outer circumferential surface of the outer-side end section of the cylindrical member, is composed of a knurling pattern formed on the outer circumferential surface of the other-side end section of the cylindrical member, and the method further comprises a step of forming the knurling pattern by performing a knurling process on the outer circumferential surface of the other-side end section of the cylindrical member.

16. The method for manufacturing a steering column according to claim 11, further comprising a step of forming the concave section by performing a pressing process on the outer circumferential surface of the other-side end section of the cylindrical member.

17. The method for manufacturing a steering column according to claim 9, wherein the convex section, which is formed in either the main body or the cylindrical member, is provided on the outer circumferential surface of the other-side end section of the cylindrical member, and the method further comprises a step of forming the concave section on the inner circumferential surface of the one-side end section of the main body portion by feeding part of the molten metal into a portion around the convex section when forming the main body portion by feeding molten metal into the mold.

18. A steering apparatus comprising:

a steering column supported by a vehicle body;

a steering shaft supported on the inner-diameter side of the steering column so as to be able to rotate; and a steering lock apparatus provided between the steering column and the steering shaft, the steering lock apparatus substantially preventing the steering shaft from rotating inside the steering column during operation, wherein the steering column is the steering column according to claim 8.

* * * * *